Figure 1:
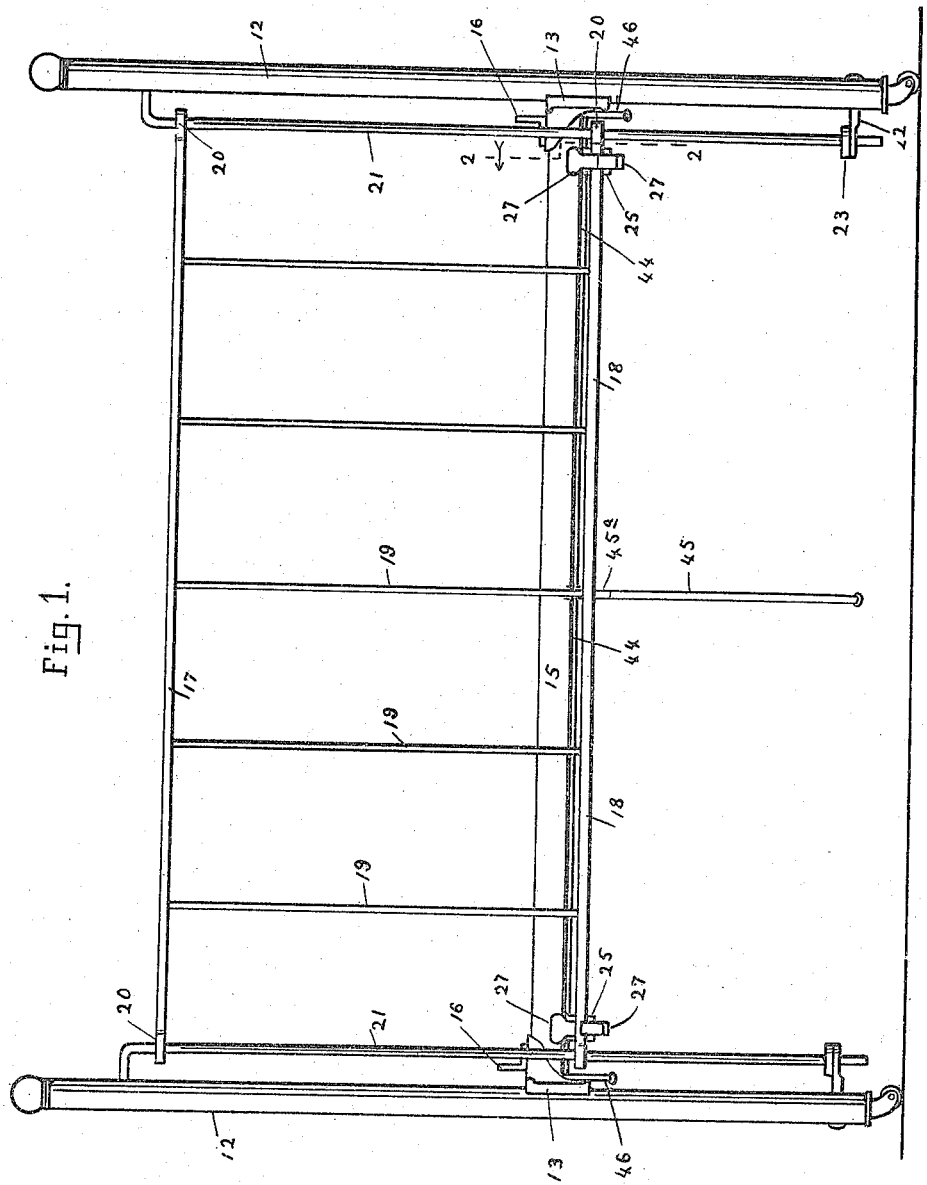

G. E. CAMP.
FASTENING FOR SLING SIDE CRIBS.
APPLICATION FILED JAN. 14, 1915.

1,194,476.

Patented Aug. 15, 1916.
4 SHEETS—SHEET 1.

WITNESSES:
S. E. Hooke
J. E. Brewer

INVENTOR
George E. Camp
BY Martin & Jones
ATTORNEYS

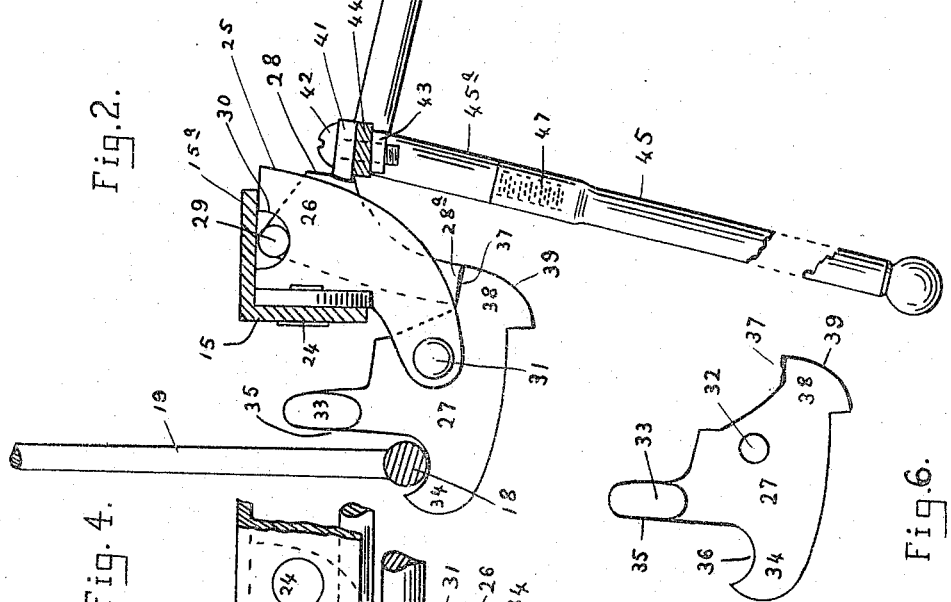

G. E. CAMP.
FASTENING FOR SLING SIDE CRIBS.
APPLICATION FILED JAN. 14, 1915.
1,194,476.
Patented Aug. 15, 1916.
4 SHEETS—SHEET 3.
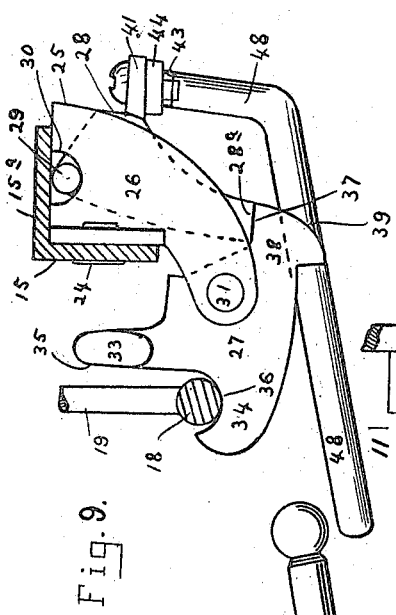
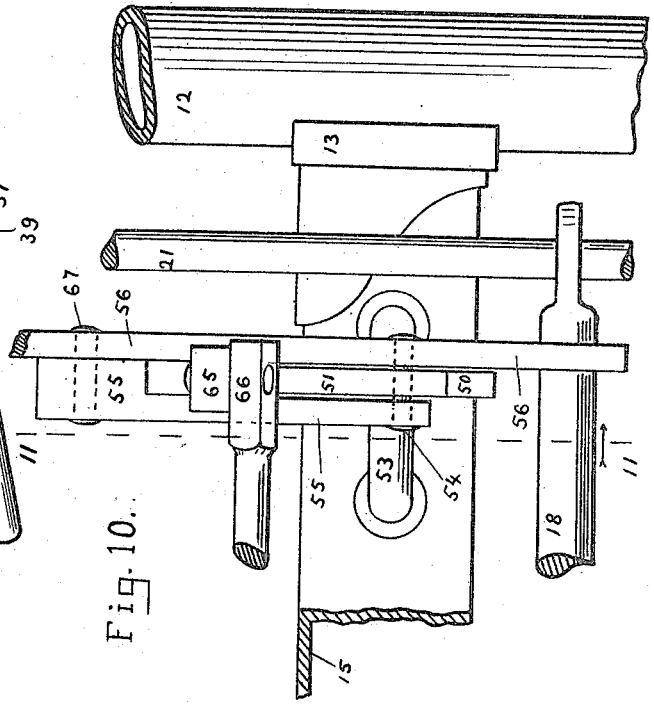
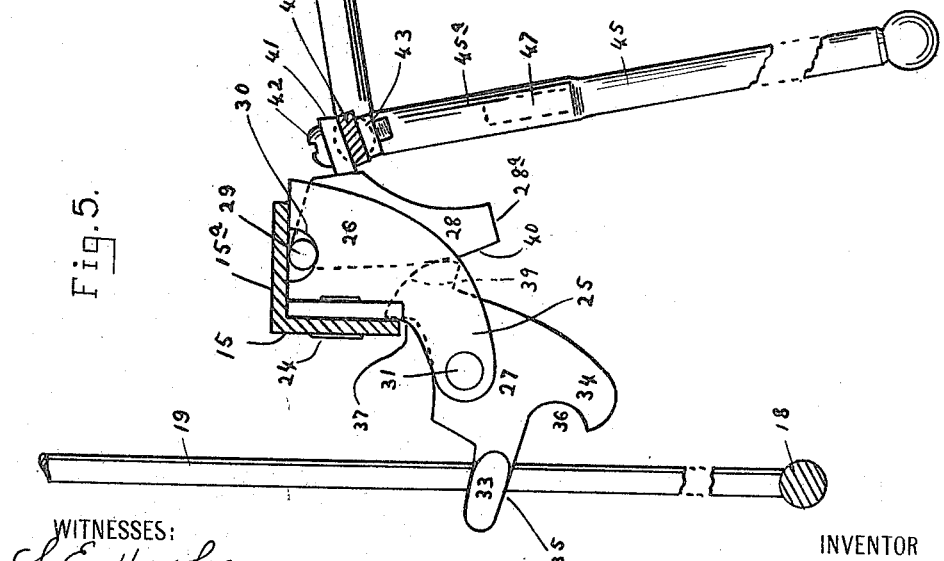
WITNESSES:
S. E. Hooks
J. E. Brewer
INVENTOR
George E. Camp
BY Martin & Jones
ATTORNEYS

G. E. CAMP.
FASTENING FOR SLING SIDE CRIBS.
APPLICATION FILED JAN. 14, 1915.

1,194,476.

Patented Aug. 15, 1916.
4 SHEETS—SHEET 4.

WITNESSES:
J. E. Hooks
J. E. Brewer

INVENTOR
George E. Camp
BY Martin & Jones
ATTORNEYS

UNITED STATES PATENT OFFICE.

GEORGE E. CAMP, OF UTICA, NEW YORK, ASSIGNOR TO FOSTER BROTHERS MANUFACTURING COMPANY, OF UTICA, NEW YORK, A CORPORATION OF NEW YORK.

FASTENING FOR SLING-SIDE CRIBS.

1,194,476. Specification of Letters Patent. Patented Aug. 15, 1916.

Application filed January 14, 1915. Serial No. 2,175.

*To all whom it may concern:*

Be it known that I, GEORGE E. CAMP, of Utica, in the county of Oneida, and State of New York, have invented certain new and useful Improvements in Fasteners for Sling-Side Cribs; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My present invention relates to fastening devices for sliding-side cribs and particularly to those fasteners which are adapted to automatically lock the sliding-side in raised position upon the side being moved to raised position and to hold the side in such raised position until it is purposely released.

One of the purposes of my present invention is to provide a fastener of the class described of improved construction and convenient but effective operation.

A further purpose of this invention is to provide a fastener of the class described which is especially adapted to positively lock the sliding-side in raised position and prevent accidental release of the side through contact of the person or clothes with the latch which engages the side and yet provides ready means to release the latch from locked position and allow the sliding-side to move to lowered position when desired.

Another purpose of this invention is to provide operatively interposed between the frame and the sliding side a fastening device wherein a latch member mounted on one of said members is used to holdingly engage a part of the other of said two members and a separate locking member is used to lockingly engage the latch when the latch is in holding position, said parts being so constructed and connected that withdrawal of the locking member from the latch allows the latch to be released and the sliding-side to descend to lowered position.

A still further purpose is to have these co-operating fastening members so constructed that the locking member at all times tends to move into locking position and the latch tends to move to non-supporting position where it is ready to be moved to supporting position upon upward movement of the side and then to be locked in holding position by the locking member moving into engagement with said latch.

A still further purpose of this invention is to provide ready and conveniently located means for releasing the fastener; and when more than one fastener is used in connection with one side, to have said releasing means connected so that a single movement of the operator simultaneously releases all of the fasteners used upon that side of the crib.

Further purposes and advantages of my invention will appear from the specification and claims herein.

Figure 12:
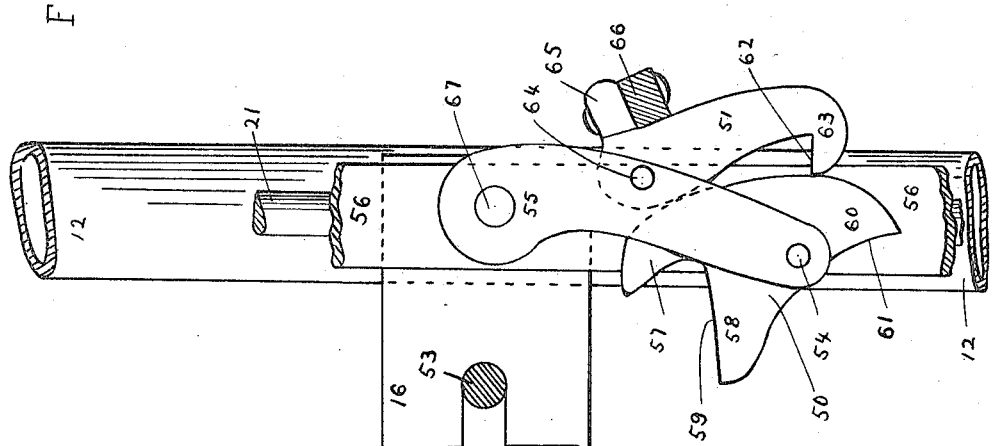
Figure 11:
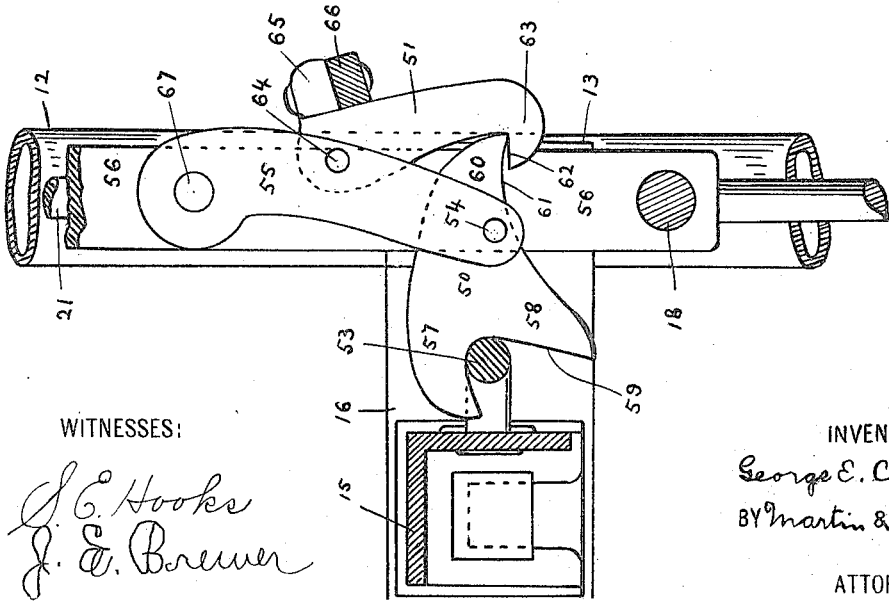

Figure 1 is a side view of a sliding side crib equipped with a fastening device embodying my invention. Fig. 2 is a perpendicular cross-sectional view on an enlarged scale on line 2—2 of Fig. 1, the fastener being shown in operative position, the latch being in holding position and the locking member in locking position therewith. Fig. 3 is a side view of the parts shown in Fig. 2, except the operating levers, as seen from the inside of the crib. Fig. 4 is a side view of the same parts, as seen from the outside of the crib. Fig. 5 is a perpendicular sectional view similar to Fig. 2 but with the parts in the position they assume when the locking member has been withdrawn from the latch and the latch has released the sliding-side. Fig. 6 is a side view of the latch. Fig. 7 is a side view of the locking member. Fig. 8 is a side view of the bracket used to support the latch and locking member in proper co-operative position. Fig. 9 is a perpendicular sectional view similar to Fig. 2 but with a modified form of controlling levers for the operation of the locking member. Fig. 10 is a side view of a corner of a crib equipped with another form of fastener embodying my invention, the latch and locking member being mounted upon the side and engaging a part of the crib frame. Fig. 11 is a perpendicular sectional view on line 11—11 of Fig. 10 with the parts in locking position. Fig. 12 is a sectional view similar to Fig. 11 but with the fastener in released position.

Referring to the drawings in a more particular description and first to Figs. 1 to 8, upon the crib frame composed, in the usual way, of corner posts 12 connected by corner fasteners 13, side rails 15 and cross rails 16, there is mounted a vertically sliding side composed of top and bottom bars 17 and 18 respectively, connected by the usual upright filling rods 19. The side may be slidingly mounted in any of the usual ways as by means of eyes 20, provided upon the ends of the top and bottom side bars 17 and 18, being mounted upon guide rods 21 held in a vertical position near the corner post 12 and spaced slightly therefrom. On top of the arms 22 provided to hold the lower end of the guide rods 21 in proper position may be placed sound deadening cushions 23 against which the sliding-side may rest when it moves to lowered position upon the guide rods 21. Securely fastened to the side rails 15 as by means of rivets 24, there is provided a bracket 25 having two vertically arranged, oppositely disposed side plates 26, substantially at right-angles to the side rail 15 and spaced apart so as to have pivotally mounted therebetween the latch 27 and the locking member 28. The locking member 28 may conveniently be pivotally or swingingly mounted in the bracket by means of laterally extending ears 29, provided on the upper end of the locking member resting at each side in recesses 30 provided in the upper edge of the plates 26 of the bracket 25. The locking member is thus placed in the bracket before the bracket is fastened to the side rail 15 and upon the bracket being fastened to the side rail 15 the horizontal web $15^a$ projects across the recesses 30 and permanently holds the locking member 28 in the bracket but allows it free pivotal motion. The lower end of the side plates 26 of the bracket 25 extends below the side-rail 15 and outwardly therefrom as indicated in Figs 2, 5 and 9 and there receives therebetween the latch 27 which is pivotally mounted upon said side plates of the bracket as by means of pin 31 extending through said side plates and through a hole 32 provided in the latch 27. The latch 27 is provided with an arm 33 and arm 34 substantially at right-angles to each other, or so that the outer or camming face 35 of arm 33 forms with the holding recess 36 in the upper side of arm 34 practically the outline of the letter J as plainly indicated in Fig. 6. Bracket 25 and latch 27 are of such size and arrangement that when latch 27 is swung with its arm 34 to a substantially horizontal position the recess 36 in the top of said arm will receive the bottom bar 18 or other engaging part of the side, while downward movement of the side and its bottom rod 18 will swing the latch 27 about on its pivot from the position shown in Fig. 2 to substantially the position shown in Fig. 5 where the arm 34 has withdrawn from the path of the downwardly moving side rod 18, and therefore allow said side rod 18 and the side of which it is a part to move to lowered position through its own gravity or other tension as desired. This swinging movement of latch 27 has brought the arm 33 outwardly and downwardly over rod 18 and into the path of said rod 18 into substantially the position shown in Fig. 5. With the parts in this position, upward movement of the side will bring the lower side rod 18 into engagement with the camming face 35 of arm 33 and swing the latch 27 back to substantially the position shown in Fig. 2 with the arm 33 in upright position and arm 34 again in a horizontal position and beneath the rod 18. In this, the holding position of the latch the upper face 37 of a rearwardly extending arm 38 upon the latch 27 has been brought to a position far enough down to enable the lower end $28^a$ of locking member 28 to swing outward or toward the side rod 18 over the said upper face 37 of said latch 27, the parts assuming the position shown clearly in Fig. 2. It will now be seen that with the parts in this position the latch 27 is locked into holding position and prevents the downward movement of the side rod 18 by reason of the locking member holding the arm 38 from upward movement, upward movement of said locking member in turn being prevented by its upper end bearing against the overhanging horizontal web $15^a$ of the side rail of the crib frame. With the latch so locked in holding position it will be obvious that any extra pressure brought against the sliding-side of the crib or any contact of the person or clothes with the latch 27 will not move the latch from holding position.

The latch 27 is released from holding position by swinging the locking member 28 inwardly or to the right as the parts are viewed in Fig. 2, until the lower end $28^a$ is entirely disengaged from the upper face 37 of the rearwardly extending arm 38 of the latch. As soon as the locking member is thus withdrawn, the latch 27 is free to move from holding position and does so move through its own weight or other tension or through the weight or other tension of the sliding-side. Meanwhile the inner curved face 39 of arm 38 slides upward against the outward edge 40 of the locking member 28 and the parts assume the position substantially as shown in Fig. 5, further swinging of the latch being prevented as by the upper face 37 of the latch striking the lower part of the side rail 15 of the crib frame.

From the inner edge of the locking member 28, there projects beyond the side plates 26 an arm 41 to which is secured, as by means of screw 42 and nut 43, a shaft 44 extending lengthwise of the side of the crib to such points as may be desired for the convenient attachment of levers for the manual or foot operation or release of the locking member. The crib illustrated in Fig. 1 is shown as being equipped with two of the fastening devices herein described, but it will be obvious that a single fastening device may be used at a central point or that more than two fastening devices may be used in the length of the crib. Where more than one fastening device is used the shaft 44 will be common to all of the locking members upon that side of the crib as shown in Figs. 1 to 5. The operating levers attached to the shaft 44 consist of a centrally located depending lever 45 adapted to be manipulated by an inward pressure thereupon from the foot of a person and an end lever 46 at the head and foot of the crib respectively extending inwardly and adapted to be manipulated by the upward pressure of a person's hand. Operation of either of these levers as indicated will obviously swing the locking member 28 inwardly on its pivotal mounting until the lower end 28ª of the locking member is withdrawn entirely from the face 37 of the latch. The locking member 28 is so mounted that its weight and the weight of the parts attached thereto tends to move the locking member 28 to locking position.

The latch 27 is so constructed and so pivotally mounted that of its own weight or through other tension when free from the locking member it tends to move to non-holding position such as indicated in Fig. 5, thereby quickly withdrawing the supporting arm 34 from beneath the side rod 18 and causing the holding arm 34 to be out of the path of the rod 18 and the arm 33 to be in the path of the rod 18, so that the arm 33 will be engaged by the upper movement of the rod 18 and thereafter the holding arm 34 moved to holding position. Preferably the outwardly extending lever 45 will have its lower end and the greater part of its length detachably secured to its upper part 45ª as by a screw joint 47 so that if desired this operating lever may be removed from the crib if it is not desired to use this lever or if the presence of children upon the floor makes it inadvisable to use said lever 45.

Fig. 9 shows the same parts as Fig. 2, except that instead of inwardly extending end levers 46, end levers 48 are used extending outwardly from shaft 44 below the corner fastening 13 and preferably between the corner post 12 and its adjacent guide rod 21, so that a downward pressure of the hand or foot upon the end of either of said levers will release the locking members 28 from locking position and allow the side to move to lowered position. In this construction that portion of the locking member inside of the pivoting point of the locking members, together with the weight of shaft 44 and that part of the levers 48 inside of the pivoting point of the locking members, is sufficient to produce the desired tendency of the locking member to move to locking position as hereinbefore described.

Referring now to the Figs. 10, 11 and 12 of the drawings, it will be seen that there is shown another form of fastener embodying my invention in that there is used a movable latch adapted to hold the side in raised position and a movable locking member adapted to lock the latch when it is in its holding position, and that this latch and locking member are operatively interposed between the sliding side and the crib frame. Instead, however, of having the latch and locking member mounted upon the crib frame with the latch engaging a part of the sliding-side, as in the form shown in Figs. 1–9, in the form of my invention shown in Figs. 10–12, latch 50 and locking member 51 are suitably movably mounted upon some part of the sliding-side and the latch engages a part of or a projection from the crib frame. In this way the latch and locking member ascend and descend with the sliding-side and each of said members has its operative movement relative to said side as the side is raised to bring the latch into engagement with the coöperating part of the crib frame or as the latch is released therefrom. Upon the crib frame comprising corner posts 12, corner fasteners 13, side rails 15 and cross rails 16, there is provided some part or projection such as ear 53 upon the side rail 15, adapted to coöperate with the latch 50 which is suitably mounted upon the sliding-side as by being pivotally mounted upon pin 54 between a bracket 55 and the end upright 56 of the sliding-side, the sliding-side in this case having said end upright 56 as well as the usual parts of a sliding-side as hereinbefore described; namely, bottom rod 18 and top rod 17 (not shown) and upright filling rods 19 (not shown). The latch 50 has two arms 57 and 58 arranged at an angle to each other and adapted to swing out and alternately engage the ear 53. The arm 57 is the holding arm adapted to over-lap the ear 53 when the side is in raised position, as plainly indicated in Fig. 11, while the arm 58 has its upper edge 59 a camming surface adapted to engage the arm 53 upon upward movement of the sliding-side and swing the latch from the position shown in Fig. 12 to the position shown in Fig. 11. The other end of latch 50 is an arm 60 extending in the opposite direction to arm 57 and adapted to have its lower side 61 engaged by the upper side 62 of the depending hook portion 63 of locking member 51 when the latch 50 has been moved so that its arm 57 is over the ear 53 or other engaging part upon the crib frame. The hook of locking member 51 points toward the latch 50, and the said locking member by its own weight or other tension tends to have its said hook move toward latch 50 so that as soon as the latch comes to holding position shown in Fig. 11, the locking member at once swings toward the latch or to the left, as the parts are illustrated, until the hook of said locking member is securely engaged with the lower surface 61 of the arm 60 of the latch. The upper end of locking member 51 is pivotally mounted upon the side as by being interposed between bracket 55 and the end rod 56 of the side and mounted upon pivotal pin 64. Extending outward from the locking member 51, there is provided an arm 65, upward movement of which it will be obvious will withdraw the locking member 51 from locking engagement with latch 50 whereupon the weight or other tension of the sliding-side will move the side downward, the ear 53 swinging the latch 50 until the arm 57 is entirely withdrawn from over the ear 53. This movement brings the parts to the position shown in Fig. 12 with the arm 58 of latch 50 extending outward beneath the ear 53. The parts are so constructed that latch 50 when free from ear 53 tends to remain in this position so that it is at all times ready upon upward movement of the sliding-side to be engaged by the ear 53 and be thereby moved into holding position. Where more than one of these fastening devices are used upon one sliding-side a connecting rod 66 may be used to connect the latches of the different fasteners so that all the fastening devices may be operated simultaneously and conveniently with one hand.

It will be understood that the arrangement of the movable members of the fastening devices in the particular position shown upon the sliding-side and the ear 53 projecting from the side rail 15 are simply illustrative of this form of my invention and are not to be taken as requiring the particular location mentioned since it is obvious that the movable members might be otherwise disposed upon the sliding-side and the latch extending into coöperative engagement with other parts of the crib frame. The bracket 55 may have its upper part rest directly against the bar 52 of the sliding-side and be firmly secured thereto as by rivet 67, while the lower part of the bracket is spaced from the said rod thus affording a convenient housing for one end of the pivoting pins 64 and 54. The bracket serves as a further protection and housing for the latch and locking member.

What I claim as new and desire to secure by Letters Patent is:

1. The combination in a sliding-side crib, of a crib frame, a vertically sliding side mounted thereon and tensioned to move to lowered position, a latch movably mounted on the frame so that it may be extended into position to support the side but adapted to normally move out of supporting position and a movable locking member adapted to hold the latch in supporting position and to be withdrawn therefrom and allow the latch to release the side.

2. The combination in a sliding-side crib, of a crib frame, a vertically sliding side mounted thereon and tensioned to move to lowered position, a latch movably mounted on the frame so that it may be extended into position to support the side but adapted to normally move out of supporting position and a movable locking member adapted to hold the latch in supporting position and to be withdrawn therefrom and allow the latch to release the side, said locking member moving to locking position again upon the latch being moved to supporting position.

3. The combination in a sliding-side crib, of a crib frame, a vertically sliding side mounted thereon and tensioned to move to lowered position, a latch movably mounted on the frame so that it may be extended into position to support the side but adapted to normally move out of supporting position and adapted when in non-supporting position to be moved to supporting position by upward movement of the sliding side thereagainst and a locking member adapted to hold the latch in supporting position and to be withdrawn therefrom and allow the latch to release the side.

4. The combination in a sliding-side crib, of a crib frame, a vertically sliding side mounted thereon and tensioned to move to lowered position, a latch movably mounted on the frame so that it may be extended into position to support the side but adapted to normally move out of supporting position and adapted when in non-supporting position to be moved to supporting position by upward movement of the sliding side thereagainst and a locking member adapted to hold the latch in supporting position and to be withdrawn therefrom and allow the latch to release the side, said locking member moving to locking position again upon the latch being moved to supporting position.

5. The combination in sliding-side crib, of a crib frame, a vertically sliding side mounted thereon and tensioned to move to lowered position, movably mounted on the frame a latch tensioned to drop to non-supporting position but adapted to be raised into position to support the side and a locking member adapted to hold the latch in supporting position and to be withdrawn therefrom and allow the latch to release the side.

6. The combination in a sliding-side crib, of a crib frame, a vertically sliding side mounted thereon and tensioned to move to lowered position, movably mounted on the frame a latch tensioned to drop to non-supporting position but adapted to be raised into position to support the side and when in non-supporting position to be moved to supporting position by upward movement of the sliding side thereagainst and a locking member adapted to hold the latch in supporting position and to be withdrawn therefrom and allow the latch to release the side.

7. The combination in a sliding-side crib, of a crib frame, a vertically sliding side mounted thereon and tensioned to move to lowered position, movably mounted on the frame a latch adapted to be raised into position to support the side but normally dropping out of supporting position and a locking member adapted to hold the latch in supporting position and to be withdrawn therefrom and allow the latch to release the side, said locking member being tensioned to move to locking position and moving to such position upon the latch coming to supporting position.

8. The combination in a sliding-side crib, of a crib frame, a vertically sliding side mounted thereon and tensioned to move to lowered position, a latch movably mounted on the frame so that it may be extended into position to support the side but adapted to normally move out of supporting position, a movable locking member adapted to hold the latch in supporting position and to be withdrawn therefrom and allow the latch to release the side, said locking member moving to locking position again upon the latch being moved to supporting position and means operative from beside the crib for withdrawing said locking member from the latch.

9. The combination in a sliding-side crib, of a crib frame, a vertically sliding side mounted thereon and tensioned to move to lowered position, a plurality of latches movably mounted on the frame so that they may be extended into position to support the side but adapted to normally move out of supporting position, a movable locking member for each latch adapted to hold the latches in supporting position and to be withdrawn therefrom and allow the latches to release the side, said locking members moving to locking position again upon the latches being moved to supporting position, and means operatively connected to all the locking members for withdrawing said locking members from their latches.

10. The combination in a sliding-side crib, of a crib frame, a vertically sliding side mounted thereon and tensioned to move to lowered position, a plurality of latches movably mounted on the frame so that they may be extended into position to support the side but adapted to normally move out of supporting position and adapted when in non-supporting position to be moved to supporting position by upward movement of the sliding side thereagainst, a locking member for each latch adapted to hold the latches in supporting position and to be withdrawn therefrom and allow the latches to release the side, and means operatively connected to all the locking members for withdrawing said locking members from their latches.

11. The combination in a sliding-side crib, of a crib frame, a vertically sliding side mounted thereon and tensioned to move to lowered position, a latch pivotally mounted on the frame and having two oppositely disposed arms adapted to alternately project into the path of the sliding side, one arm extending below the side when in raised position and releasing the side when withdrawn therefrom and the other arm being above the side and adapted to be engaged thereby as the side is raised and swing the latch until the other arm is moved out under the side, means for locking said latch when the first arm is in operative position and means adapted to disengage said locking means.

12. The combination in a sliding-side crib, of a crib frame, a vertically sliding side mounted thereon and tensioned to move to lowered position, a latch pivotally mounted on the frame and having two oppositely disposed arms adapted to alternately project into the path of the sliding side, one arm extending below the side when in raised position and releasing the side when withdrawn therefrom and the other arm being above the side and adapted to be engaged thereby as the side is raised and swing the latch until the other arm is moved out under the side, means for locking said latch when the first arm is in operative position and means adapted to disengage said locking means, said latch being tensioned to swing to non-supporting position when free.

13. The combination in a sliding-side crib, of a crib frame, a vertically sliding side mounted thereon and tensioned to move to lowered position, a latch pivotally mounted on the frame and having two oppositely disposed arms adapted to alternately project into the path of the sliding side, one arm extending below the side when in raised position and releasing the side when withdrawn therefrom and the other arm being above the side and adapted to be engaged thereby as the side is raised and swing the latch until the other arm is moved out under the side, a pivotally mounted locking member adapted to swing into locking engagement with said latch when the latch is in holding position and means to disengage said locking means.

14. The combination in a sliding-side crib, of a crib frame, a vertically sliding side mounted thereon and tensioned to move to lowered position, a latch movably mounted on the frame and adapted to be extended to support the side, a movable locking member adapted to lock the latch in supporting position and to be withdrawn therefrom and allow the latch to release the side and means operatively connected to said locking member and extending to the end of the crib and adapted to disengage said locking member.

15. The combination in a sliding-side crib, of a crib frame, a vertically sliding side mounted thereon and tensioned to move to lowered position, a latch movably mounted on the frame and adapted to be raised to support the side but adapted to normally drop from supporting position, a movable locking member adapted to hold the latch in supporting position and to be withdrawn therefrom and allow the latch to release the side and means operative from beside the crib for disengaging said locking member from the latch.

16. The combination in a sliding-side crib, of a crib frame, a side slidingly mounted in relation thereto, a latch movably mounted on one of said members and tensioned to normally move out of the path of the other member but adapted to be extended and engage said other member and thereby support the side in raised position and a movable locking member adapted to hold the latch in supporting position and to be withdrawn therefrom and allow the latch to release its hold.

17. The combination in a sliding-side crib, of a crib frame, a side slidingly mounted in relation thereto, a latch movably mounted on one of said members and tensioned to normally move out of the path of the other member but adapted to be extended and holdingly engage said other member when the side is in raised position and a movable locking member adapted to hold the latch in supporting position and to be withdrawn therefrom and allow the latch to release its hold, said locking member returning to holding position upon the latch being returned to supporting position.

18. The combination in a sliding-side crib, of a crib frame, a side slidingly mounted in relation thereto, a latch movably mounted on one of said members and tensioned to normally move out of the path of the other member but adapted to engage said other member when the side is in raised position and a locking member adapted to hold the latch when so engaged and hold the side in raised position and to be withdrawn from such locking engagement and allow the latch to release its hold and allow the side to move downward, said latch being moved to engaging position by upward movement of the side.

In witness whereof I have affixed my signature, in the presence of two witnesses, this 31st day of Dec., 1914.

GEORGE E. CAMP.

Witnesses:
C. D. PHILLIPS,
S. E. HOOKS.

Copies of this patent may be obtained for five cents each, by addressing the "Commissioner of Patents, Washington, D. C."

It is hereby certified that the title of invention in Letters Patent No. 1,194,476, granted August 15, 1916, upon the application of George E. Camp, of Utica, New York, was erroneously given as "Fastenings for Sling-Side Cribs," whereas said title should have been given as *Fastenings for Sliding-Side Cribs;* and that the said Letters Patent should be read with this correction therein that the same may conform to the record of the case in the Patent Office.

Signed and sealed this 24th day of October, A. D., 1916.

[SEAL.]

F. W. H. CLAY,
*Acting Commissioner of Patents.*